United States Patent
Sheng et al.

(10) Patent No.: US 7,505,448 B2
(45) Date of Patent: Mar. 17, 2009

(54) METHOD OF WIRELESS CHANNEL RESOURCE ALLOCATION AND RATE CONTROL IN A CDMA COMMUNICATION SYSTEM

(75) Inventors: Liu Sheng, Shenzhen (CN); Baijun Zhao, Shenzhen (CN)

(73) Assignee: Utstarcom (China) Co. Ltd., Beijing (CN)

( * ) Notice: Subject to any disclaimer, the term of this patent is extended or adjusted under 35 U.S.C. 154(b) by 211 days.

(21) Appl. No.: 10/580,288

(22) PCT Filed: Nov. 27, 2003

(86) PCT No.: PCT/CN03/01012

§ 371 (c)(1),
(2), (4) Date: Aug. 30, 2006

(87) PCT Pub. No.: WO2005/053329

PCT Pub. Date: Jun. 9, 2005

(65) Prior Publication Data

US 2007/0115915 A1   May 24, 2007

(51) Int. Cl.
*H04J 3/06* (2006.01)
(52) U.S. Cl. .................. 370/350; 370/348; 370/503
(58) Field of Classification Search .......... None See application file for complete search history.

(56) References Cited

U.S. PATENT DOCUMENTS

| 5,914,950 | A | 6/1999 | Tiedemann, Jr. et al. |
| 2003/0095538 | A1* | 5/2003 | Kayama et al. ............. 370/350 |
| 2007/0066320 | A1* | 3/2007 | Padovani et al. ............ 455/450 |

FOREIGN PATENT DOCUMENTS

| CN | 1360446 A | 7/2002 |
| CN | 1423495 A | 6/2003 |
| EP | 1 217 852 A1 | 6/2002 |
| WO | WO-98/45966 A2 | 10/1998 |

* cited by examiner

*Primary Examiner*—Lester Kincaid
*Assistant Examiner*—Phuoc Doan
(74) *Attorney, Agent, or Firm*—Harness, Dickey & Pierce, P.L.C.

(57) ABSTRACT

The present invention discloses a method for resource allocation and rate control of dedicated channels in a Wideband Code Division Multiple Access (WCDMA) communication system, the method being characterized by comprising: a) the step of determining channel states of downlink DCH channels for non-realtime data services; b) the step of determining states of the users using said downlink DCH channels; and the step of correlating the channel states determined in step a) with the user states determined in step b), and dynamically allocating the DCH channels with certain rates to the users in the different User states according to a wireless measurement result measured by a current transmission channel and based on the priority and fairness requirements. According to the present invention, the method effectively realizes the bandwidth resource allocation and rate control, improves the radio resource availability and provides users, to the maximum extent, with a data service bandwidth as high as possible.

34 Claims, 13 Drawing Sheets

Fig.3

BCH ——————— P-CCPCH

FACH ——————— S-CCPCH

PCH ⟋

DSCH ——————— PDSCH

RACH ——————— PRACH

CPCH ——————— PCPCH

DCH ——————— DPCH (DPCCH/DPDCH)

Fig. 4

| No. | Applicable Traffic type | Uplink rate (kbps) | Downlink rate (kbps) |
|---|---|---|---|
| 1 | Interactive/Background | 8 | 8 |
| 2 | Interactive/Background | 32 | 8 |
| 3 | Interactive/Background | 16 | 16 |
| 4 | Interactive/Background | 32 | 32 |
| 5 | Interactive/Background | 32 | 64 |
| 6 | Interactive/Background | 64 | 64 |
| 7 | Interactive/Background | 64 | 128 |
| 8 | Interactive/Background | 128 | 128 |
| 9 | Interactive/Background | 64 | 144 |
| 10 | Interactive/Background | 144 | 144 |
| 11 | Interactive/Background | 64 | 256 |
| 12 | Interactive/Background | 64 | 384 |
| 13 | Interactive/Background | 128 | 384 |
| 14 | Interactive/Background | 384 | 384 |

METHOD OF WIRELESS CHANNEL RESOURCE ALLOCATION AND RATE CONTROL IN A CDMA COMMUNICATION SYSTEM

FIELD OF THE INVENTION

The present invention relates to relevant techniques of channel allocation in a mobile communication system. More particularly, the present invention relates to a method for resource allocation and rate control of dedicated channels in a Wideband Code Division Multiple Access (WCDMA) communication system.

BACKGROUND ART

UMTS (Universal Mobile Telecommunications System) is the $3^{rd}$ generation mobile communication system of the wireless technology using WCDMA. In the system architecture of the UMTS terrestrial radio access network (UTRAN) shown in FIG. 1, a radio network controller (RNC) is connected to a core network via an Iu interface, the RNCs are interconnected via an Iur interface, and one RNC is connected to one or more Node Bs via an Iub interface. A Node B contains one or more cells, the cell being a basic unit to which a user equipment (UE) has wireless access (not shown), wherein a radio interface between the UE and the UTRAN is a Uu interface (not shown).

In the protocol documents of the standardization organization 3GPP (the 3rd Generation Partnership Project) of the UMTS, there mainly are TS25.2XX, TS25.3XX and other serial specifications relevant to the UMTS radio interface protocol. In the UMTS radio interface protocol architecture as shown in FIG. 2, the bottom layer is a physical (PHY) layer, and in a control plane, above the physical layer are a media access control (MAC) layer, a radio link control (RLC) layer and a radio resource control (RRC) layer, respectively; in a user plane, the radio interface protocol consists of the physical layer, the MAC layer, the RLC layer and a packet data convergence protocol (PDCP) layer, wherein the PDCP layer is only for a packet-switch (PS) domain. Physical channels are provided by the physical layer, logical channels are provided between the MAC layer and the RLC layer, and transmission channels are provided between the MAC layer and the physical layer.

Uplink transmission channels comprise RACH (Random Access Channel), CPCH (Common Packet Channel), DCH (Dedicated Channel) and the like, and downlink transmission channels comprise BCH (Broadcast Channel), PCH (Paging Channel), FACH (Forward Access Channel), DSCH (Downlink Shared Channel), DCH and the like, wherein the uplink and downlink transmission channels for carrying user data comprise RACH/FACH, CPCH/FACH, DCH/DCH and DCH/(DCH+DSCH). Uplink physical channels comprise PRACH (Physical Random Access Channel), PCPCH (Physical Common Packet Channel), uplink DPCCH (Dedicated Physical Control Channel), uplink DPDCH (Dedicated Physical Data Channel) and the like, downlink physical channels comprise P-CCPCH (Primary Common Control Physical Channel), S-CCPCH (Secondary Common Control Physical Channel), PDSCH (Physical Downlink Shared Channel), downlink DPCCH, downlink DPDCH and the like, and these physical channels have the corresponding relationships, as shown in FIG. 3, with the transmission channels, wherein the DPCH (Dedicated Physical Channel) is a general term of DPCCH/DPDCH. Furthermore, in the downlink, are SCH (Synchronization Channel), CPICH (Common Pilot Channel), AICH (Acquisition Indicator Channel), PICH (Paging Indication Channel), CSICH (CPCH Status Indication Channel), CD/CA-ICH (Collision Detection/Channel Assignment Indication Channel) and the like, all of which are peculiar to the physical layer.

UMTS bearer services mainly comprise conversational and streaming traffic with higher realtime requirements and non-realtime interactive and background traffic. Among RACH, CPCH, FACH, DCH and DSCH for bearing user data, the RACH/FACH is mainly used for non-realtime burst services with a lower rate, and the CPCH and RACH are similar but can provide a higher uplink transmission rate. The DSCH is a transmission channel of a downlink shared type and is greatly adapted to non-realtime burst services with a higher rate, but the DSCH must be used together with a DCH. The DCH is a bidirectional dedicated transmission channel, and upon being established, the resources thereof will be entirely occupied until the channel is released, so the DCH can meet the transmission needs of realtime services. However, when a DCH is used for the transmission of non-realtime services, the utilization ratio of channel bandwidth is lower, so it is necessary to adopt appropriate scheduling and allocation algorithms to improve the utilization ratio of radio resources as much as possible. According to the specification TS34.108 of the 3GPP, the maximum uplink and downlink rates of radio access bearers (RABs) which typically transmit interactive/background services using a DCH (the corresponding physical channel is DPCH) are as shown in FIG. 4, and the current UMTS business systems generally support part or all of these RABs. It can be seen that, due to the uplink/downlink asymmetry of non-realtime packet data services, the typical configuration of uplink and downlink rates is that the uplink rate is less than the downlink rate, and this case still occurs upon a higher rate.

In the current UMTS commercial system based on the R99 version, most of the UE commercial products cannot well support CPCH and DSCH. Thus, other than non-realtime services with a small amount of data that are transmitted using a RACH/FACH, common non-realtime services all need to be transmitted using DCHs. On the other hand, with the expectation of high-rate data services by the practical 3G market, the requirements for 384 kbps bandwidth at most are raised. However, the resources of high-rate channels for non-realtime data services are limited, especially in the downlink direction. On one hand, parts of DCH resources need to be used for adaptive multi-rate (AMR) voice and other realtime services, and on the other hand, due to the uplink/downlink asymmetry of non-realtime services and the limitation on power and orthogonal variable spreading factor (OVSF) channel codes, the resources of the high-rate DCH channels that can be actually used for non-realtime services are made limited. Therefore, an effective method for channel bandwidth resource allocation and rate control is capable of improving radio resource usage and providing users, to the maximum extent, with a data service bandwidth as high as possible, and it is one of the key factors that influences the success of the 3G market in terms of data services.

An important factor in dedicated channel resource allocation and rate control is the actual data rate of a service source. Since the UTRAN only provides radio access bearers and cannot directly obtain service status information of a service source, it is necessary for the UTRAN to judge data rate transmission requirements of the service source by certain measurements. At present, the UMTS mainly adopts a measurement of traffic of a transmission channel to reflect rate requirements of a service source. Details relating to the measurement can be consulted by referring to 3GPP TS25.321, TS25.331 and other specifications, as well as U.S. Patent Application "US 2002/0114280 A1, Method of measuring traffic volume in mobile communication system". The UTRAN can directly obtain a measurement result of traffic of a downlink MAC and measure control information via RRC, and can also obtain a measurement result of the traffic of an uplink MAC which is provided by a UE. The typical measurement result of the traffic comprises a current amount of buffer occupancies, an average amount of buffer occupancies and a variance of buffer occupancies (in byte), wherein the average amount of buffer occupancies reflects a data rate status of a service carried on the transmission channel, and the variance of buffer occupancies reflects the magnitude of the service bursts carried on the transmission channel.

Besides the traffic, another possible measurement object which reflects a service rate is flow or a channel utilization ratio of each transmission channel. The transmission channel flow is a user data amount of transport blocks transmitted (downlink) or received (uplink) during each TTI (transmission time interval) by each transmission channel, and the transmission channel utilization ratio is defined as follows:

$$\text{transport channel utilization ratio} = \frac{\text{transport channel average flow}/\text{transport channel } TTI}{\text{transport channel maximum channel rate}} \quad (1)$$

The flow or channel utilization ratio can be measured more simply than the traffic and can be directly measured in a RNC without needing a measurement report from the UE. In the same way, the mean value and variance of the flow or channel utilization ratio can also be obtained.

A document TR25.922 of the 3GPP recites a handover between a DCH/DCH and a RACH/FACH based on a traffic measurement of a transmission channel, and a method for DCH/DCH rate change. According to the document, when the traffic exceeds a certain threshold, there is a capability for a handover from a RACH/FACH to a DCH/DCH, or improving the DCH rate by decreasing spreading factors. On the contrary, when the traffic is less than a certain threshold, there is a capability for a handover from the DCH/DCH to the RACH/FACH, or improving the DCH rate by increasing spreading factors. In addition, U.S patent application "US 2003/0012217 A1 Channel-type switching to a common channel based on common channel load", a PCT patent "WO 01/31950 A1, Channel-type switching from a common channel to a dedicated channel based on common channel load", "WO 01/76304 A1, Channel-type switching based on cell load", "WO 02/39775 A1, Channel switching in UMTS" and other documents propose as well a plurality of determining methods for a handover between the DCH/DCH and the RACH/FACH.

According to documents TR25.922 and TS25.331 of the 3GPP, during the handover between a DCH/DCH and a RACH/FACH, it is typical to carry out the channel handover based on whether a current configuration of a common channel of a cell is the same as the lately reserved configuration in the UE via RRC processes "Physical Channel Reconfiguration" or "Transmission channel Reconfiguration"; during the DCH/DCH rate change, it is typical to change a channel rate by the RRC process "Physical Channel Reconfiguration".

In the prior art, what is more concerned is methods for a handover between a DCH/DCH and a RACH/FACH. With regard to bandwidth resource allocation and rate control of a DCH, it is only allowable to determine whether to perform a DCH rate change based on a traffic measurement of a transmission channel. As above-described, bandwidth resources of a DCH, especially the bandwidth resources of the downlink DCH are limited, but the main data transmission is carried out by the DCH. Thus, how to effectively allocate and schedule total available DCH bandwidth resources within a cell is the key to improve the usage of radio resources and provide users with a data service bandwidth as high as possible to the maximum extent. In view of this, the present invention sets forth an effective method for resource allocation and rate control of a dedicated channel.

SUMMARY OF THE INVENTION

In order to solve the problem of the lack of an effective method for bandwidth resource allocation and rate control of dedicated channels in the prior art, one object of the present invention is to provide an effective method for bandwidth resource allocation and rate control of dedicated channels so as to effectively allocate and schedule total available DCH channel bandwidth resources within a cell, so that the utilization ratio of radio resources can be improved and users can be provided, to the maximum extent, with a data service bandwidth as high as possible.

The present invention sets forth a method for resource allocation and rate control of dedicated channels DCHs for non-realtime data services in a Wideband Code Division Multiple Access (WCDMA) communication system, wherein said DCH channels comprises uplink DCH channels and downlink DCH channels, and the allocation of channel resources and rates of the uplink DCH channels are carried out on the basis of that of the downlink DCH channel, the method being characterized by comprising:

a) the step of determining channel states of downlink DCH channels for non-realtime data services, wherein said DCH channel states include: a blocked state, a macro-diversity state, an available state, an idle state and a frozen state;

b) the step of determining states of users using said downlink DCH channels, wherein said user states include: an occupying user, a common newly-added user, a handover newly-added user, an occupied user, a maintenance user or a macro-diversity user; and c) correlating the channel states determined in step a) with the user states determined in step b), and dynamically allocating DCH channels with certain rates for the users in the different user states according to a wireless measurement result measured by a current transmission channel and based on the priority and fairness requirements.

The method according to the present invention solves the problem that in the prior art that resources of high-rate channels for non-realtime data services are rather limited. By implementing the method of the present invention, the channel states of the available DCH channel resources can be correlated in real time with the current user states and the users in the different user states are reasonably allocated DCH channel resources. As a result, the bandwidth resource allocation and rate control are effectively realized, the utilization ratio of radio resources is improved and the users are provided, to the maximum extent, with a data service bandwidth as high as possible.

BRIEF DESCRIPTION OF THE DRAWINGS

The method for resource allocation and rate control of radio channels in a WCDMA communication system according to the present invention will be described below in detail with reference to the following drawings, wherein:

FIG. 3 illustrates the mapping relationships between transmission channels and physical channels in the prior-art UTRAN network;

FIG. 4 illustrates a radio access bearer which typically transmits interactive/background type services using DCHs in the UTRAN network;

BEST MODE FOR IMPLEMENTING THE INVENTION

The best mode for implementing the present invention will be described below in detail with reference to the accompanying drawings. Hence, after reading the following detailed description of the advantages, characteristics and other aspects of the present invention, those skilled in the art can have a better understanding of the present invention.

In the UMTS, due to the uplink/downlink asymmetry of non-realtime data services and the limitation on downlink power and orthogonal variable spreading factor (OVSF) channel codes, the downlinks are caused to be a bottle-neck for DCH resource allocation. Therefore, the present invention aims at the resource allocation and rate control of downlink DCHs. In order to avoid the ping-pong effect resulting from quick changes of wireless measurement values, that a measurement value is greater or lower than a certain threshold means that this result is always kept within a delay time, in the following description. In addition, due to the difference in the capability of UEs, DCHs with some rates may not be supported. Thus, the resource allocation of uplink and downlink DCHs as described below is on the premise that a DCH channel of which the rate fails to be supported by a UE is not allocated to the UE.

Figure 1:
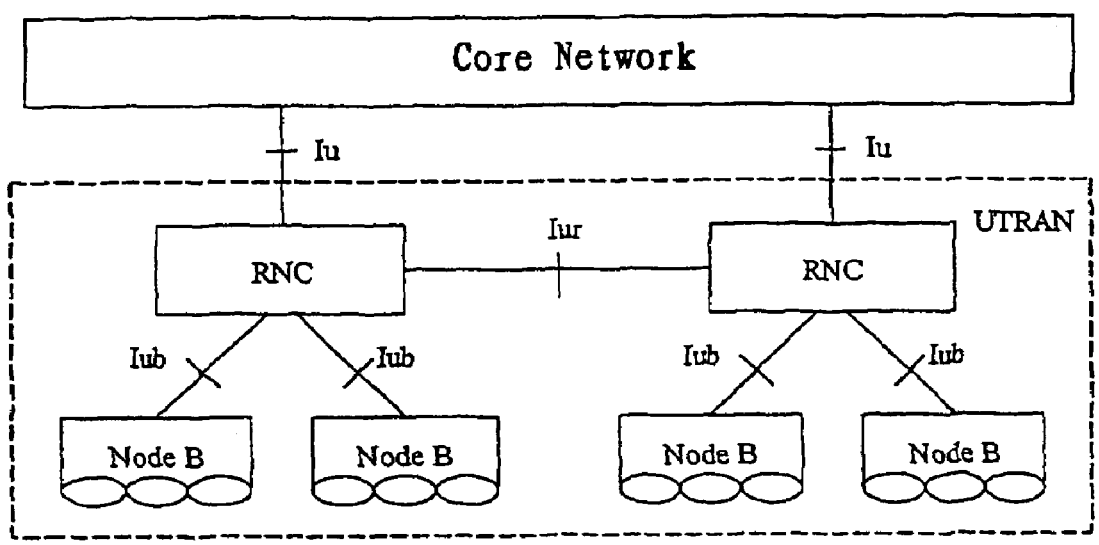
FIG. 1 illustrates a UTRAN network architecture in the prior art.
Figure 2:
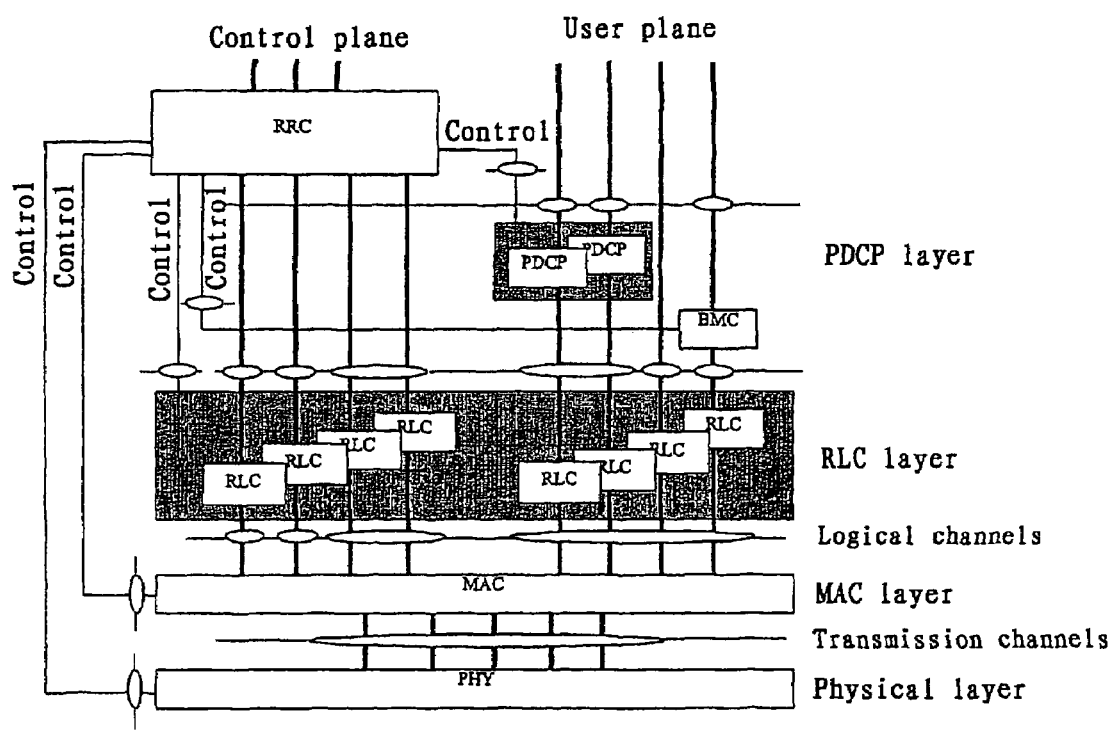
FIG. 2 illustrates a radio interface protocol architecture in the prior-art UTRAN network.
Figure 5:
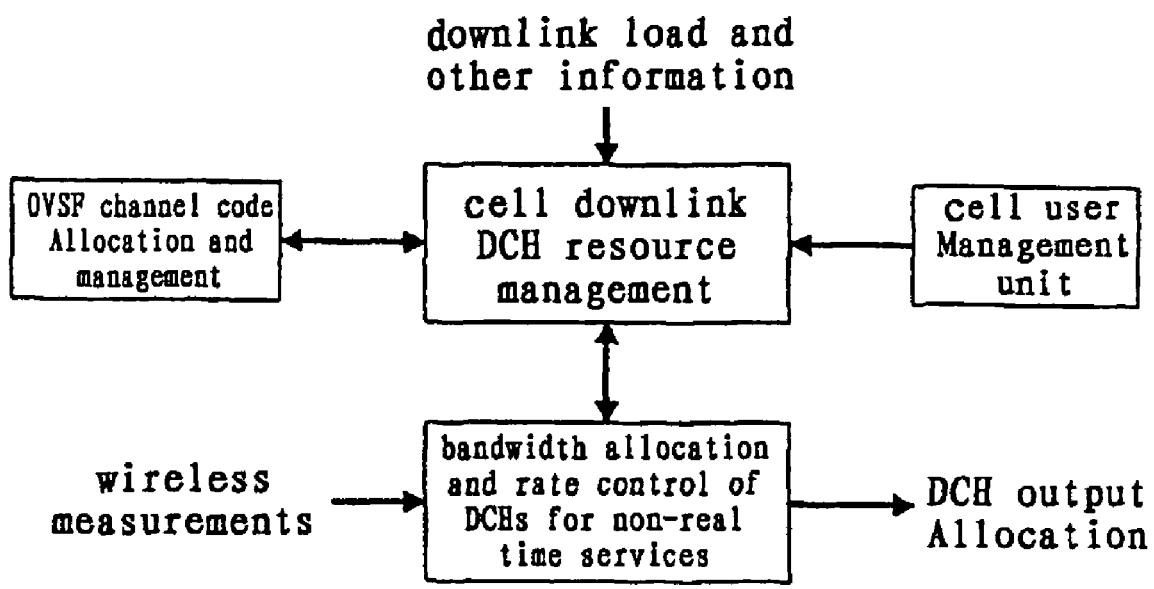
FIG. 5 illustrates an allocating apparatus for allocating resources of downlink DCHs for non-realtime services, which implements the method of the present invention.

1. Resource Allocation of Downlink DCHs for Non-Realtime Services (a) Resource Allocation Apparatus of Downlink DCHs for Non-Realtime Services According to the resource allocation apparatus of downlink DCHs for non-realtime services, as shown in FIG. 5, a bandwidth allocation and rate control unit (DCAU) of DCHs for non-realtime services are responsible for dynamically allocating a downlink DCH with a certain rate for each active user in a current available channel set of downlink DCHs for non-realtime services, based on wireless measurements such as a traffic, flow or channel utilization ratio of a transmission channel. A DCH resource management unit (DRMU) of downlink channels in a cell provides the DCAU with a current available channel set of downlink DCHs for non-realtime services (namely, a channel resource pool of downlink DCHs for non-realtime services) in accordance with active users, downlink loads and other information of realtime and non-realtime services of the DCHs in the current cell, and ensures the size of the set, i.e., the number of channels in the set, to be always not less than the current number of active users of the non-realtime services. Due to the factors such as the increase or decrease in the active users of the DCHs for realtime and non-realtime services, and the change in downlink load, the current available channel set of downlink DCHs for non-realtime services are variable, but the change in the set, compared with the change in the downlink DCH rate of the active users of non-realtime service, is generally quite slow.

In FIG. 5, other two units connected to the DRMU are an OVSF channel code allocation and management unit, and a cell user management unit, wherein the OVSF channel code allocation and management unit is responsible for allocation and management of downlink channel code resources, and the cell user management unit carries out managements of handovers between common and dedicated channel, user's initial access and release, as well as handover-user's access and release. The cell user management unit delivers relevant information of newly-added users to the DRMU, and the DRMU controls the DCAU to complete DCH channel allocation for a new non-realtime service user. Then, the DCAU feeds back a result of the DCH channel allocation to the DRMU, and the DRMU informs the cell user management unit of the allocation result. As above-described, the DRMU further configures a channel resource pool of downlink DCHs for non-realtime services in accordance with current information of realtime and non-realtime service active users of the DCHs, which is provided by the cell user management unit, in combination with the downlink load and so forth. Thus, an interactive process between the DRMU and the DCAU comprises downlink channel allocation and release of downlink DCHs for new non-realtime service users and channel resource re-allocation of downlink DCHs for non-realtime services.

(b) Resource Re-Allocation Process of Downlink DCHs for Non-Realtime Services

The downlink DCH channel resource re-allocation process means that the DRMU, by inquiring of the DCAU about information of the occupancy state, i.e., the status of each DCH in a current downlink DCH resource pool, re-configures a downlink DCH resource pool according to the current resource status of the downlink DCH. The downlink DCH resource pool is re-configured for a plurality of reasons, such as the reason that the DRMU adds or deletes DCHs to or from the downlink DCH resource pool for non-realtime services, and splits or combines the DCHs, and so forth. Splitting the DCHs means that the DRMU, by splitting OVSF channel codes of some higher-rate DCHs in the downlink DCH resource pool for non-realtime services, obtains a plurality of lower-rate DCHs, and this process is mainly used in the following cases: when it is necessary to allocate a downlink DCH with a certain rate for realtime service users but there are no corresponding channel code resources, the DRMU may decrease the rate of some DCHs in the downlink bCH resource pool for non-realtime services, and provides the realtime services with the needed downlink DCH through the OVSF channel code re-allocation; when the number of non-realtime service active users increases up to a certain threshold, and especially, exceeds the number of DCHs in the downlink DCH resource pool for non-realtime services, the DRMU may decrease the rate of some DCHs in the downlink DCH resource pool for non-real-time services, and enables, through the OVSF channel code re-allocation, more non-realtime service active users to get access; in case of an downlink overload, a cell overload control function unit may requires the DRMU to reduce the downlink load by decreasing the rate of some higher-rate DCHs in the downlink DCH resource pool for non-realtime services. On the contrary, when the number of real-time or non-realtime active users decreases or the downlink overload has been eliminated, the DRMU may, through the OVSF channel code re-allocation, combine low-rate DCHs into high-rate DCHs so as to provide a greater bandwidth for non-realtime service active users. Furthermore, an OVSF channel code allocation and management unit may also require the DRMU to alter the current downlink DCH resource pool for non-realtime services for optimizing the downlink OVSF code resources. The typical case is a downlink code tree re-washing operation, in which the OVSF channel code allocation and management unit will require a DCH corresponding to a certain node in the OVSF code tree to be reconfigured as a DCH with an identical rate corresponding to another node in the OVSF code tree, and this reconfiguration does not change the rate of the DCH.

Figure 6A:
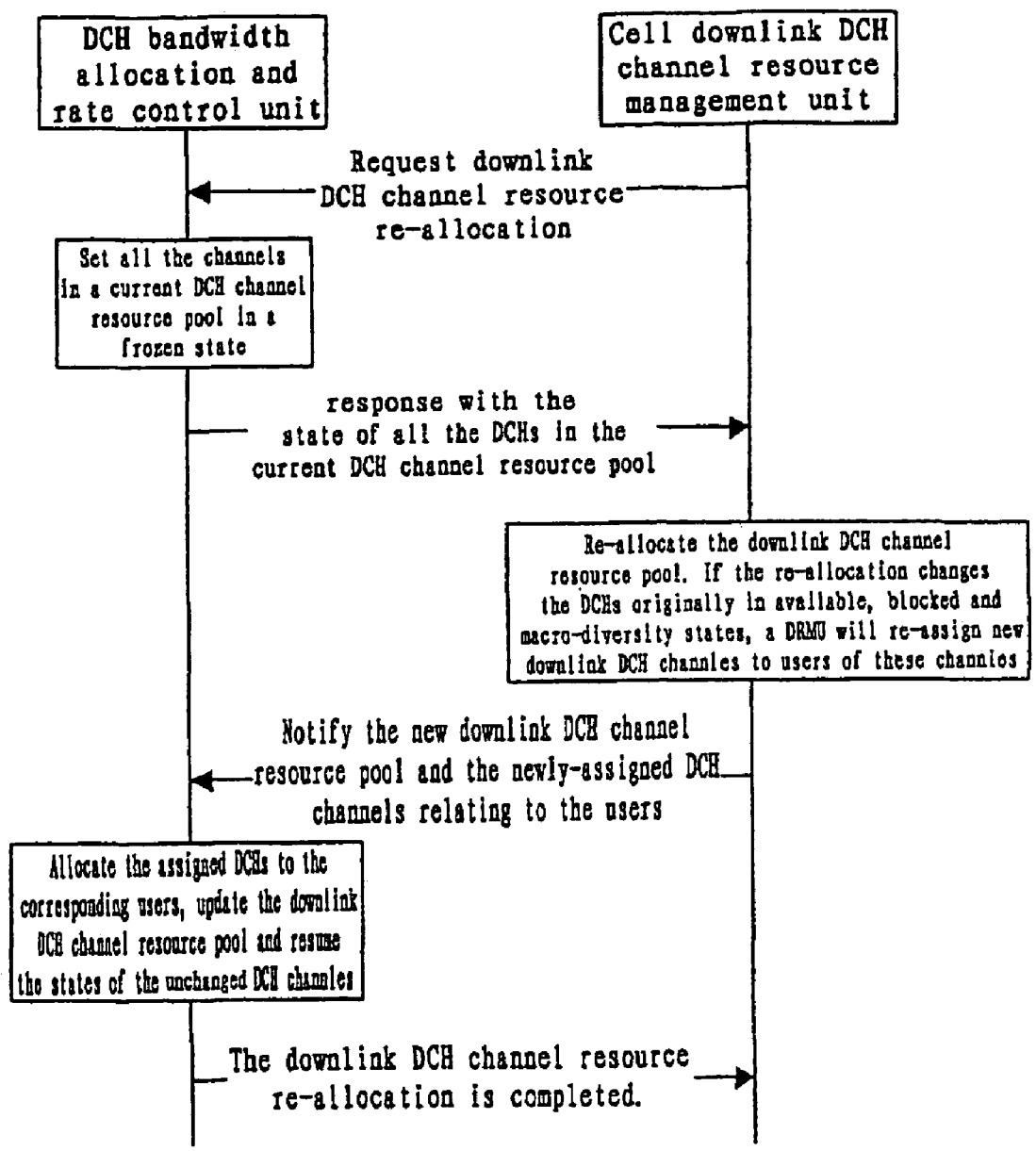
FIG. 6(a) illustrates a re-allocation process of re-allocating resources of downlink DCHs for non-realtime services according to the present invention.

FIG. 6(a) illustrates a channel resource allocation process of downlink DCHs for non-realtime services. Once the DCAU receives a request for resource allocation of downlink DCHs transmitted by the DRMU, the DCAU immediately set all the channels in the current DCH channel resource pool in a frozen state, stops all the operations of the DCH bandwidth allocation and rate control, and transmits to the DRMU a response containing state information of all the DCHs in the current downlink DCH resource pool; after receiving the response, the DRMU reconfigures the downlink DCH resource pool for non-realtime services as required based on the current state information of the DCHs, wherein the reconfiguration may change the rate of the DCHs in idle, available and blocked states, and the DCH in a macro-diversity state allows the re-configuration without change in the rate. If the re-configuration changes the DCHs originally in available, blocked and macro-diversity states, the DRMU will re-assign a new downlink DCH for users of the above channels; after receiving a re-allocation result from the DRMU, the DCAU updates the downlink DCH resource pool for non-realtime services and assigns a new downlink DCH to the above users. If the newly-designated downlink DCHs have a different rate from that of the original downlink DCHs, a downlink DCH occupancy timer of the DCH is reset and the DCH enters a blocked state, and otherwise returns to a state prior to the frozen state thereof.

Figure 6B:
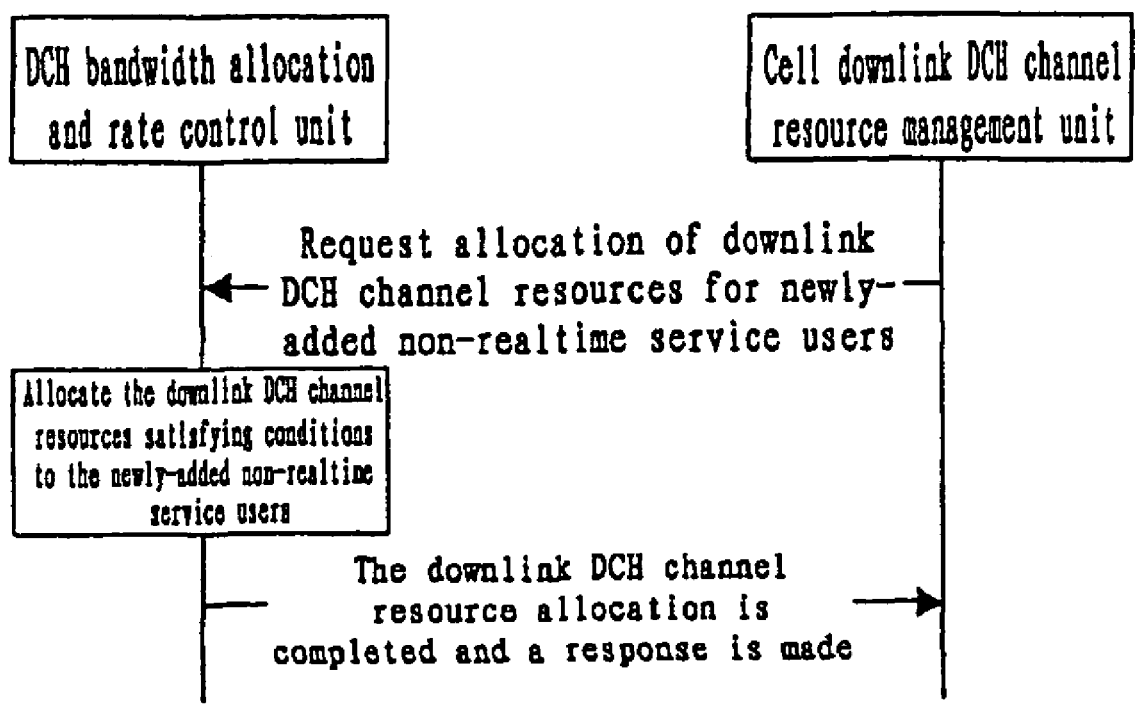
FIG. 6(b) illustrates a resource combining and resource pool updating process of low-rate downlink DCHs for non-realtime services according to the present invention.

(c) Allocation and Release Process of Downlink DCHs for New Non-Realtime Service Users The other interactive process between the DRMU and the DCAU is an allocation and release process of downlink DCHs for new non-real-time service users. When the non-realtime service users have an initial access to a system, or perform a handover (including a hard handover, a soft handover and a softer handover) to the present cell from other cells or are newly-added during a handover from a RACH/FACH to a DCH, the DRMU will notify the DCAU of types of the new users (namely, the reasons why they are newly-added), rate requirement (with regard to the handover-users) and other information, and the DCAU, according to the information, completes DCH allocation for the new non-realtime users, and feeds back an allocation result to the DRMU, as shown in FIG. 6(b). The reasons for a new addition at least comprise: user initial access, a handover from the RACH/FACH to the DCH, hard handover to the present cell, soft handover to the present cell, softer handover to the present cell and so forth. On the contrary, when the non-realtime users need to be deleted in cases where a conversion ends, a handover is performed out of the present cell, or a handover is performed from the DCH to the RACH/FACH, etc., the DRMU will notify the DCAU to release the DCH resources occupied by it, and the DCAU will feed back a release result to the DRMU.

2. Bandwidth Allocation and Rate Control of Downlink DCHs for Non-Realtime Services As above-stated, the DCAU is responsible for dynamically allocating a downlink DCH with a certain rate for each active user in a current available channel set of downlink DCHs for the non-realtime services, based on wireless measurements such as the traffic, flow or channel utilization ratio of a transmission channel.

(a) Resource States and State Transfer Process for Downlink DCHs

Blocked State

The frequent channel rate switching will increase a radio signaling amount, so that more radio resources are occupied and the signaling processing burden of a network is enlarged. Thus, in order to avoid the ping-pong effect and decrease the cost of the channel rate switching, according to the present invention, a downlink DCH occupancy timer is started immediately after a DCH is allocated, and when the timer indicates the time less than $T_{k,min}^{DL}$, no matter how the traffic, flow or channel utilization ratio, or other wireless measurements of the DCH changes, the DCH resources are always blocked and cannot be occupied by other users; if a DCH is occupied for the time longer than $T_{k,min}^{DL}$ but within the maximum occupancy time $T_{k,max}^{DL}$ ($T_{k,max}^{DL} > T_{k,min}^{DL}$), and the wireless measurements of the DCH including the traffic, or flow or channel utilization ratio and so forth is higher than a lower limit $M_{low}^{DL}$, the channel resources will also be blocked. $T_{k,min}^{DL}$ is the minimum occupancy time of the k-th downlink DCH, $T_{k,max}^{DL}$ is the maximum occupancy time of the k-th downlink DCH, and a subscript k is for differentiating DCHs with different rates (a general presumption that DCHs have rates in a order from high to low may after all be accepted).

Macro-Diversity State

When a DCH user in the present cell enters a macro-diversity state of a soft handover or a softer handover, the DCH enters the macro-diversity state, and the occupancy timer of the downlink DCH thereof is reset and pauses counting. A rate control is not performed on the DCH in this state.

Available State

In order to guarantee fairness, even though each data service user has the same opportunity to obtain a use right of a high-rate channel, when a DCH is occupied for a time exceeding the maximum occupancy time $T_{k,max}^{DL}$, according to the present invention, no matter how the traffic, flow or channel utilization ratio, or other wireless measurements of the DCH vary, the DCH is always in an available state, that is, it can be occupied by other users. In addition, if a DCH is occupied for a time exceeding $T_{k,min}^{DL}$ but within the maximum occupancy time $T_{k,max}^{DL}$ (where $T_{k,max}^{DL} > T^{k,minDL}$), and the traffic, flow, or channel utilization ratio, or other wireless measurements of the DCH is lower than the lower limit $M_{low}^{DL}$, the channel resources will also be in an available state.

Idle State

A DCH in an idle state is a DCH that is not used by any user in the current DCH resource pool for non-realtime services. A DCH in an idle state is typically generated for the following reasons: a DCH is newly added, since a cell downlink DCH resource management unit adjusts the DCH resource pool for non-realtime services; a DCH occupied by a non-realtime service user is released since a conversation is ended; since a non-realtime service user performs a handover to RACH/FACH, a DCH occupied thereby is released; and since a non-realtime service user performs a handover to other cells, a DCH occupied thereby is released.

Frozen State

After receiving a downlink DCH resource re-allocation request from the DRMU, the DCAU immediately sets all the channels in the current downlink DCH resource pool in a frozen state. As for a DCH originally in a blocked state, its downlink DCH occupancy timer is paused, and all the operations of the DCH bandwidth allocation and rate control are also stopped, but the traffic, flow, or channel utilization ratio or other wireless measurements of the DCH are still performed. After the downlink DCH resource re-allocation is completed, the unchanged channels before and after the re-allocation are immediately restored into a state prior to the frozen state. As for the changed DCHs, if newly-assigned downlink DCHs have a different rate from that of the original downlink DCHs, the downlink DCH occupancy timer of the DCHs is reset and the DCHs enter a blocked state; otherwise, they enter the state prior to the frozen state. After the DCHs leave the frozen state, the counting of the downlink DCH occupancy timer is immediately resumed.

State Transfer Process

Figure 7:
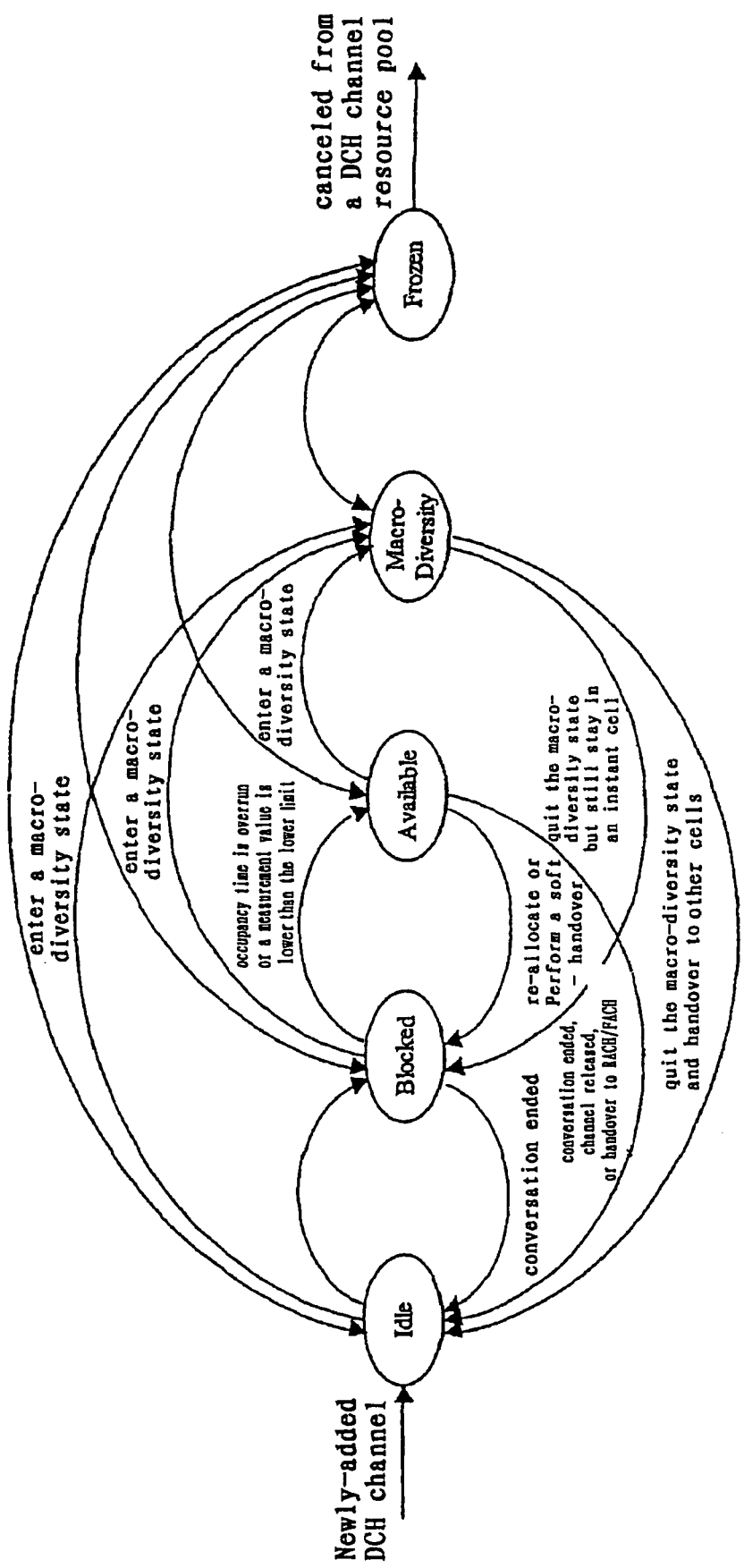
FIG. 7 illustrates a resource state transfer diagram of downlink DCHs according to the present invention.

FIG. 7 shows a downlink DCH resource state transfer process, wherein Idle, Blocked, Available, Frozen, and Macro-Diversity represent an idle state, a blocked state, an available state, a frozen state and a macro-diversity state, respectively. A DCH is newly added for re-allocation of the downlink DCH resource pool for non-realtime services and enters an idle state, a DCH in a blocked state is released because a user thereof ends a conversation, and enters an idle state, a DCH in an available state is released because a user thereof ends a conversation or performs a handover to the RACH/FACH, and enters an idle state; a DCH in a macro-diversity state is released because a user thereof performs a handover to other cells, and enters an idle state. The DCHs in idle and available states enter a blocked state for being allocated to the occupying or newly-added users; a DCH in a macro-diversity state enters a blocked state because a user thereof quits the macro-diversity and still stays in the present cell; a DCH in a blocked state enters an available state when the channel occupancy time exceeds $T_{k,min}^{DL}$, while the traffic, flow, or channel utilization ratio or other wireless measurements of the DCH is lower than the lower limit $M_{low}^{DL}$, or the channel occupancy time is overrun, i.e., greater than $T_{k,max}^{DL}$. The DCHs in idle, available and blocked states may enter macro-diversity state due to the soft handover or softer handover. The DCHs in idle, blocked, available and macro-diversity states may enter or quit a frozen state due to the downlink DCH resource re-allocation for non-realtime services.

(b) Users in Bandwidth Allocation and Rate Control of Downlink DCHs

Occupying User

If a downlink DCH is occupied for a time exceeding $T_{k,min}^{DL}$, while the traffic, flow or channel utilization ratio or other wireless measurements of the downlink DCH exceeds the upper limit $M_{high}^{DL}$, a user of the downlink DCH is called an occupying user. The user will enter a downlink DCH resource allocation queue to wait for an allocation of a higher rate downlink DCH. If the traffic, flow or channel utilization ratio or other measurements of the original downlink DCH of the user, before acquiring the allocation, is lower than the upper limit $M_{high}^{DL}$, the user should be canceled from the downlink DCH resource allocation queue. However, if the original downlink DCH of the user has becomes a channel with the highest rate in the current downlink DCH resource pool for non-realtime services, the user will no longer be an occupying user to enter the downlink DCH resource allocation queue. Downlink DCHs in idle and available states can be allocated to an occupying user. The occupying user always intends to compete for a downlink DCH with a higher channel rate than its own, and a typical characteristic of the occupying user is that when the user itself occupies a high-rate downlink DCH resources, it also releases the original downlink DCH resources occupied thereby.

Common Newly-Added User and Handover Newly-Added User

A common newly-added user is newly added, since a non-realtime service user gets an initial access to a system or performs a handover from a RACH/FACH to a DCH. A typical characteristic of the common newly-added user is that the user itself originally did not have downlink DCH resources, and in order to simplify the allocation process, only a downlink DCH in an idle state is allowed to be allocated to a common newly-added user. The original uplink and downlink DCH rates of the common newly-added user are marked as zero.

A handover newly-added user is newly-added due to a handover (including hard handover, soft handover and softer handover) from other cells to the present cell. The handover newly-added user itself does not have downlink DCH resources, but in order to ensure a handover user to have allocation in a priority, downlink DCHs in idle and available states are allowed to be allocated to a handover newly-added user. As for a handover newly-added user due to a soft or softer handover, its original uplink and downlink DCH rates are the uplink and downlink rates of other radio links in an active set of the user; as for a handover newly-added user due to a hard handover, its uplink and downlink DCH rates are the uplink and downlink rates of the user's original DCH.

Occupied User

A user whose downlink DCH is in an available state is called an occupied user. When the downlink DCH of the occupied user is occupied by an occupying user, it immediately occupies the original downlink DCH of the occupying user, that is, the occupying user and the occupied user adopt a channel permutation mode for a direct rate switching therebetween.

Maintenance User and Macro-Diversity User

A maintenance user is a user whose downlink DCH is in a blocked state, and a macro-diversity user is a user whose downlink DCH is in a macro-diversity state. These two types of users do not occupy downlink DCH resources of other users, and meanwhile, their own downlink DCH resources will not be occupied by other users, either.

(c) Downlink Loss Level and DCH Resource Allocation Queue Priority

An average transmission power of a downlink DCH is in direct proportion to a service target signal-to-interference ratio (SIR), user data rate and downlink loss which the DCH carries. When the downlink power is limited, a UE whose downlink loss is smaller can more easily reach a higher rate on the premise of meeting the target SIR. Thus, allowing a UE with a smaller downlink loss to obtain a higher rate with a priority is conducive to enabling a cell downlink to reach a higher total data throughput under the condition that a certain downlink transmitting power is determined. Hence, in the present invention, according to cell coverage and other configuration parameters determined in a cell wireless planning, a cell downlink loss is classified into different levels (typically 3-4 levels). If a downlink loss level of a user corresponds to a smaller downlink loss, the user will enter a downlink DCH resource allocation queue with a high priority when requiring an allocation of a DCH.

In the UMTS, the downlink loss can be obtained by two ways: if the UE supports a measurement report of the downlink loss, the UE can directly provide a measurement value thereof; if the UE fails to support the measurement report of the downlink loss, the UE will provide a CPICH receiving signal channel power (CPICH RSCP), and a RNC, according to the known transmission of the CPICH, solves the measurement value from the following equation:

$$\text{downlink loss (dB)} = CPICH \text{ transmission power} - CPICH\ RSCP \quad (2)$$

(d) Downlink DCH Resource Allocation Strategy and Queue Management

Figure 8:
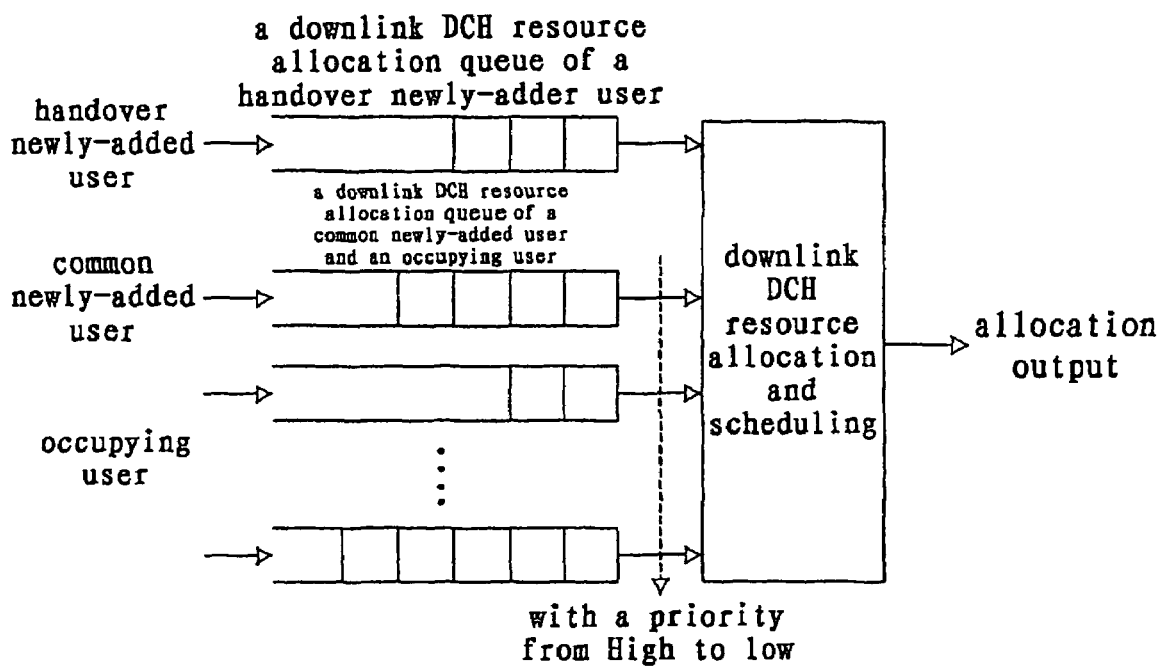
FIG. 8 illustrates resource allocation queues of downlink DCHs according to the present invention.

As shown in FIG. 8, the downlink DCH resource allocation queue according to the present invention is divided into two groups, wherein a downlink DCH resource allocation queue (HQ) of a handover newly-added user is formed of a single queue and responsible for the downlink DCH resource allocation of the handover newly-added user; according to different downlink loss levels of the users, a DCH resource allocation queue (NPQ) of a common newly-added user and an occupying user is formed of a plurality of queues with different priorities and responsible for the downlink DCH resource allocation of the common newly-added user and the occupying user, and the occupying user and common newly-added user with a smaller downlink loss will enter a high-priority NPQ queue.

The HQ queue should be allocated in preference for having a high priority, and only when the HQ queue is empty, is an allocation processing of the NPQ queue carried out. In the allocation processing of the NPQ queue, once a new handover newly-added user enters the HQ queue, the allocation processing of the NPQ queue is immediately interrupted and an allocation processing of the HQ queue is carried out. When and only when the HQ queue is empty, the allocation processing of the NPQ queue is continued.

The NPQ scheduling can be performed using a plurality of flexible modes. The present invention is not limited to a specific queue scheduling method, but, as a preferred solution, the present invention utilizes a weighed Round-Robin allocation strategy. In this solution, the allocation is performed under polling with a priority from high to low, and the queue with a higher priority has a larger number of users with an allocation opportunity under one polling. Take the case in which three priority levels are utilized as an example, the weighed values from high to low are 40%, 30% and 20% in turn, and the queues with 3 priority levels from high to low in one polling respectively have 4/3/2 users that can acquire an allocation opportunity.

A common newly-added user can only be allocated, from downlink DCH resources in an idle state, a downlink DCH which satisfies the rate and other conditions, while a handover newly-added user and an occupying user can both be allocated downlink DCH resources in idle and available states, wherein each user is allocated in preference, from downlink DCH resources in an idle state, a downlink DCH stratifying the rate and other conditions. If the downlink DCH resources in the idle state do not have a downlink DCH satisfying the rate and other conditions, the user will then be allocated from downlink DCH resources in the available state, a downlink DCH satisfying the rate and other conditions.

As for handover newly-added users in the HQ queue resulting from a soft handover and a softer handover, their downlink DCH rate must be identical with a downlink DCH rate of other radio links in an active set of the users. Thus, it is necessary to first perform an uplink and downlink access control discrimination. If fails, the reason for the failure should be indicated in a message returned to the DRMU as a failure in the uplink or/and downlink access control; if the access control is allowed, a downlink DCH with a rate identical with a downlink DCH rate of other radio links in the active set thereof will be searched for in the downlink DCH resources in an idle state, and if it is found, the allocation succeeds; otherwise, a downlink DCH with the above rate is searched for in the downlink DCH resources in an available state, and if exists, the downlink DCH in the available state will be allocated to the handover newly-added user, and the downlink DCH user will be re-allocated from the downlink DCH resources in the idle state, a downlink DCH with a rate being closest to and smaller than the original rate; if the downlink DCH resources in the available state do not have a downlink DCH with a match rate, the allocation to the handover newly-added user fails and the reason for the failure should be indicated in a response message returned to the DRMU as inexistence of a downlink DCH with a match rate. The DCH allocation process of the handover newly-added user resulting from a soft handover or a softer handover is as shown in FIG. (a).

As for a handover newly-added user in the HQ queue resulting from a hard handover, first let its downlink DCH rate be the same as the original downlink DCH rate of the user and carry out downlink access control discrimination. If fails, take a next smaller downlink DCH rate and carry out again the downlink access control discrimination till success; if succeeds, search in turn, in an uplink DCH rate value domain corresponding to the downlink DCH with the above rate, for values allowed by the uplink access control and equal to or smaller than the original uplink DCH rate of the user, and if not found, take a next smaller downlink DCH rate and search again for an uplink DCH rate allowed by the uplink access control, and if succeeds, the uplink and downlink DCH rates allowed by the access control are found. Subsequently, search, in the downlink DCH resources in the idle state, for a downlink DCH with the above rate, and if it is found, the allocation succeeds; otherwise, search in the downlink DCH resources in the available state, for a downlink DCH with the above rate, and if exists, the downlink DCH in the available state is allocated to the handover newly-added user, and the user of the downlink DCH will be re-allocated, from the downlink DCH resources in the idle state, a downlink DCH with a rate being closest to and smaller than the original rate thereof. If the downlink DCH resources in the available state still do not have a downlink DCH with a match rate, then take a next smaller downlink DCH rate and re-search for the uplink DCH rate allowed by the uplink access control, and repeat the above allocation process. Unless the uplink and downlink access control fails, the handover newly-added user can always be allocated a downlink DCH with a certain rate, since the minimum downlink DCH rate is allowed to be used. The DCH allocation process of the handover newly-added user resulting from a hard handover is as shown in FIG. 9(*b*).

Figure 9A:
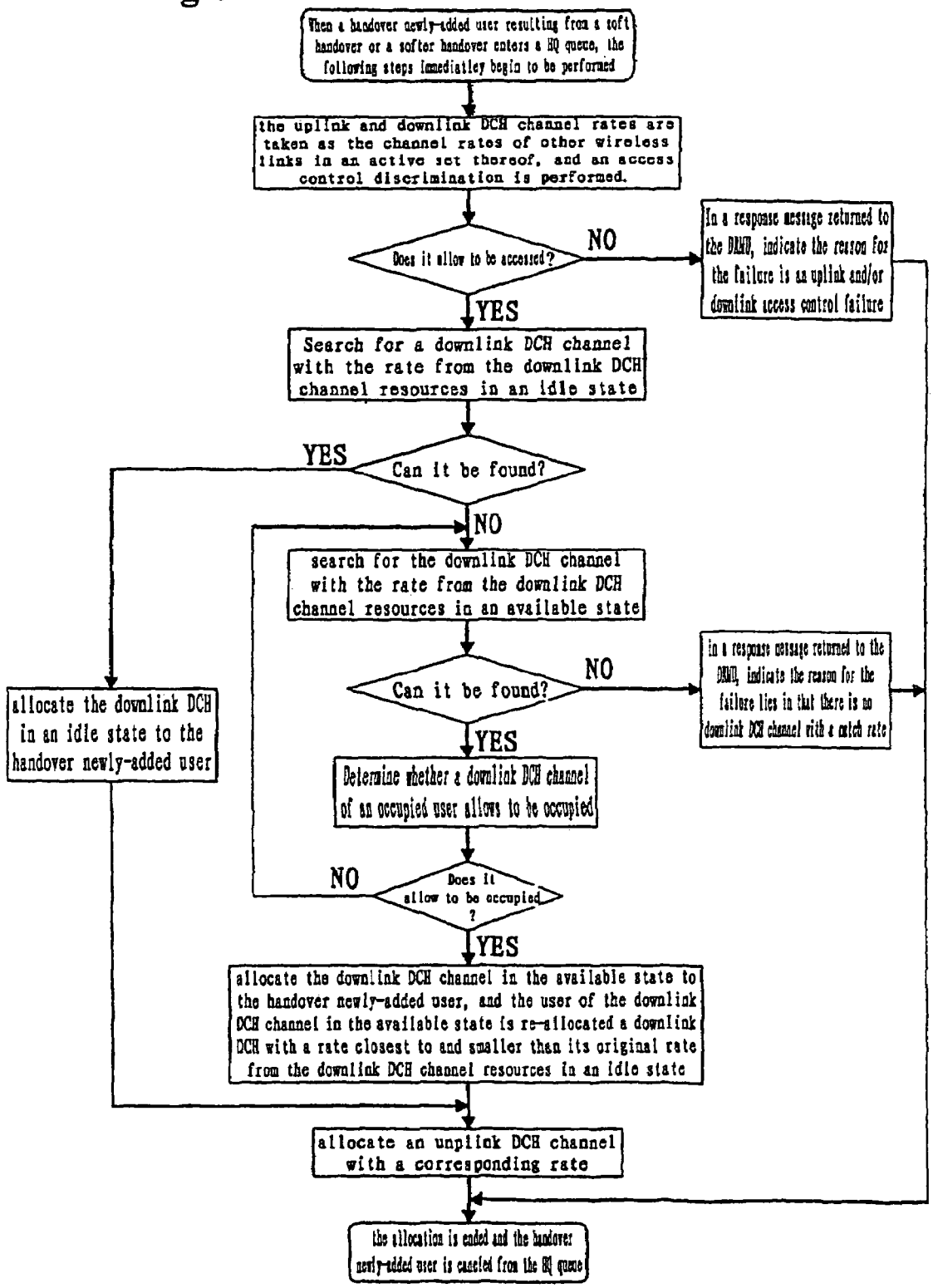
FIG. 9(a) illustrates a DCH channel allocation and rate control process performed for a handover newly-added user resulting from a soft handover or a softer handover according to the present invention.
Figure 9B:
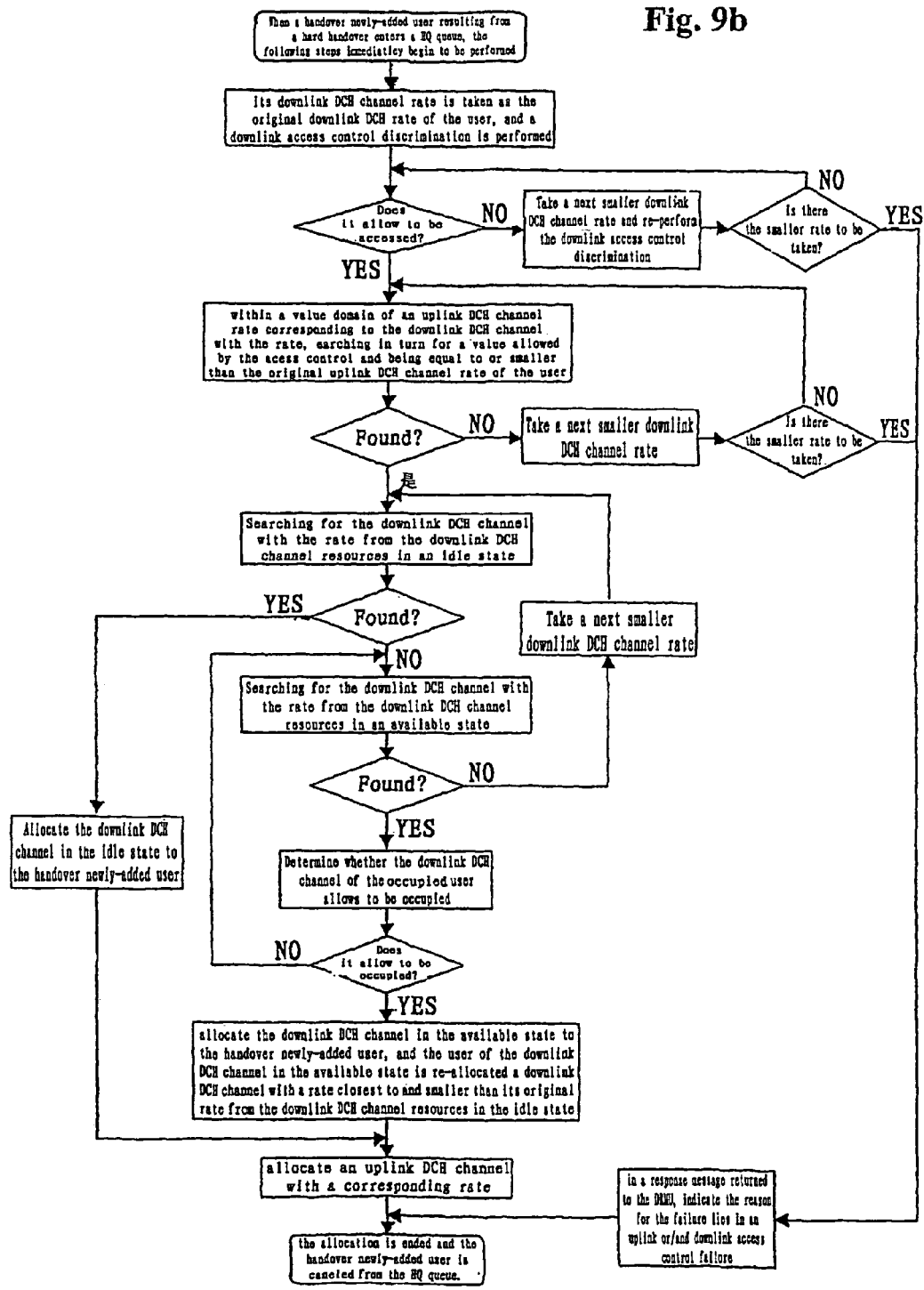
FIG. 9(b) illustrates DCH channel allocation and rate control process for a handover newly-added user resulting from a hard handover according to the present invention.
Figure 9C:
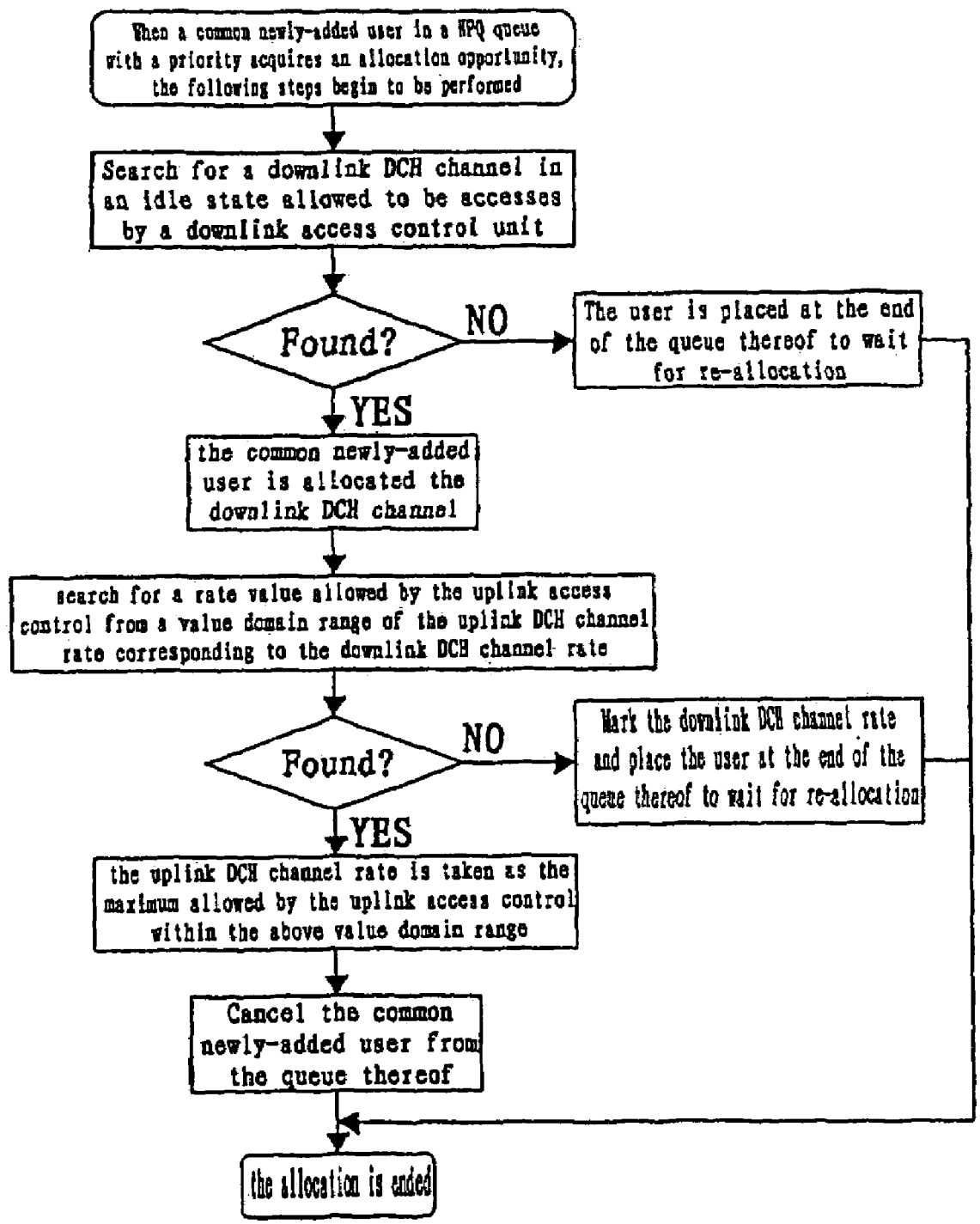
FIG. 9(c) illustrates DCH channel allocation and rate control process for a common newly-added user according to the present invention.

In a downlink DCH allocation process of the NPQ queue with a priority, as for a common newly-added use having acquired an allocation opportunity, if there is a downlink DCH in an idle state for allocation and it is allowed by a downlink access control unit, then the user will utilize the downlink DCH channel; otherwise, the user will be placed at the end of the queue thereof to wait for re-allocation, and since the original uplink and downlink DCH rate is marked as zero, the user can always acquire downlink DCH resources with a certain rate after a plurality of polls. With reference to the below analysis, the uplink and downlink DCH allocation process of the common newly-added user is as shown in FIG. 9(c).

Figure 9D:
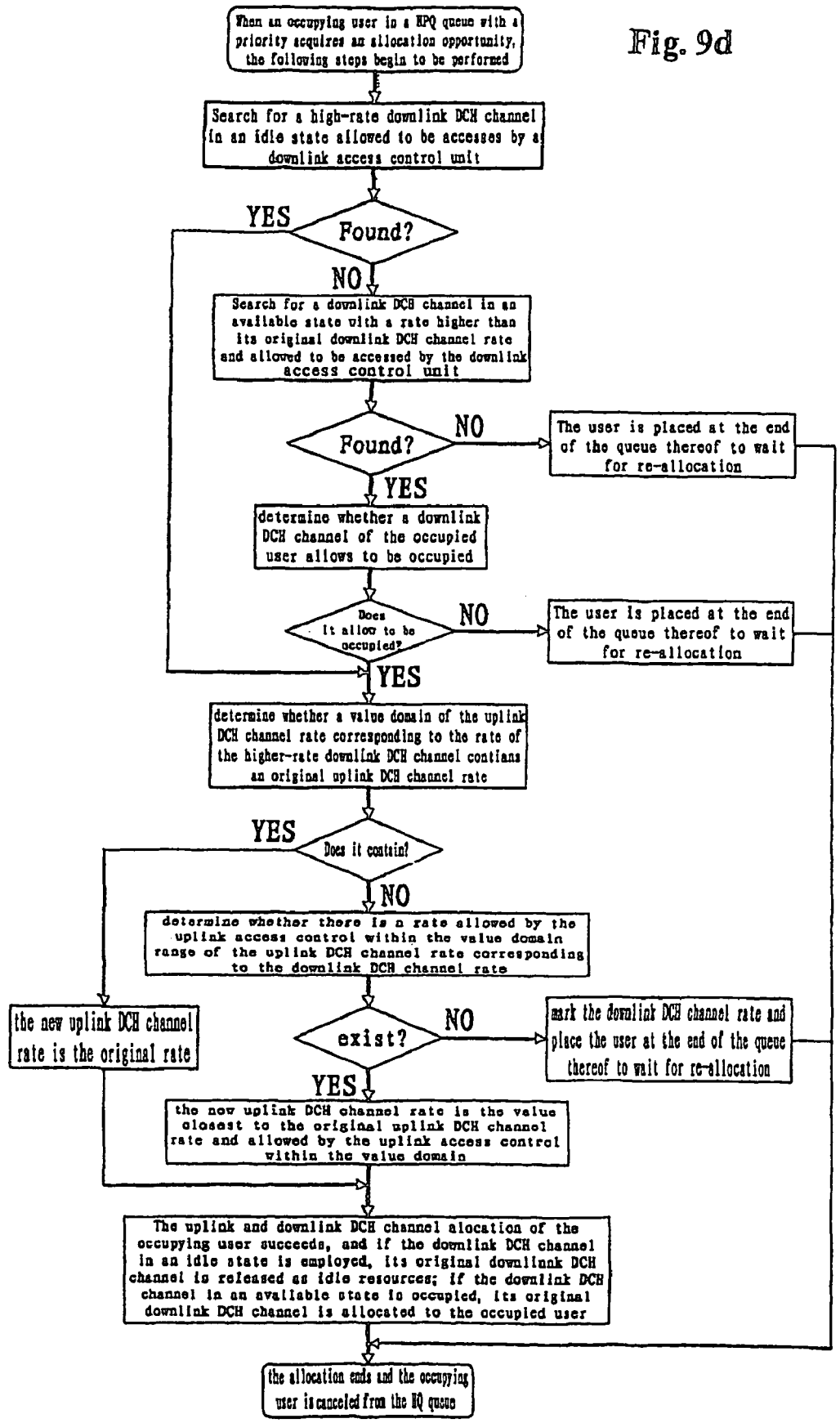
FIG. 9(d) illustrates a DCH channel allocation and rate control process for an occupying user according to the present invention.

In a downlink DCH allocation process of the NPQ queue with a priority, as for an occupying user having acquired an allocation opportunity, if there is a high-rate downlink DCH in an idle state for allocation and it is allowed by a downlink access control unit, then the occupying user will acquire the high-rate downlink DCH and immediately release its downlink DCH to become idle resources; if there is a downlink DCH in an idle state with a rate higher than the original downlink DCH rate of the user for allocation and it is allowed to get access by the downlink access control unit, then the user will occupy the high-rate downlink DCH, and its original downlink DCH will be directly allocated to the occupied user. If there is no downlink DCH in an available or idle state with a rate higher than the original DCH rate of the user, or the downlink access control discrimination fails, the user will be placed at the end of the queue thereof to wait for re-allocation. With reference to the below analysis, the uplink and downlink DCH allocation process of the occupying user is as shown in FIG. 9(d).

(e) Uplink DCH Rate Allocation Problems During Downlink DCH Allocation

When a downlink DCH rate of an occupying user and of an occupied user is re-allocated, since the uplink and downlink DCH rates have limited values, it is necessary to simultaneously allocate an appropriate uplink DCH rate. In addition, a common newly-added user and a handover newly-added user also need to be allocated an appropriate DCH rate when being allocated a downlink DCH rate.

As for the common newly-added user, once the downlink DCH is successfully allocated, the uplink DCH rate thereof is immediately specified as a maximum of a rate allowed by the access control within a value domain range of an uplink DCH rate which the downlink DCH rate corresponds to. If all the values within the value domain range of the uplink DCH rate which the downlink DCH rate corresponds to undergo a failed access control discrimination, the downlink DCH rate is marked, and the common newly-added user is placed at the end of the queue thereof to wait for re-allocation. During the re-allocation, the rate of downlink DCH should be not greater than the marked rate during the previous failure. If the allocation is still unsuccessful within a predetermined time range, the reason for the failure is indicated, in a response message returned to the DRMU, as an uplink access control failure. As for the handover newly-added user, since the uplink and downlink access control discrimination is first performed before the DCH allocation, so long as the downlink DCH is successfully allocated, then the uplink DCH rate thereof is a rate allowed to get access by the uplink access control discrimination. FIG. 9(c) describes an uplink DCH rate allocation process of a common newly-added user.

As for an occupying user, if its newly-allocated downlink DCH rate is always greater than its original downlink DCH rate, whereas the rate of an uplink DCH of a downlink DCH with a higher rate generally has an increased value. In this way, if an uplink DCH rate value domain which the newly-allocated downlink DCH with a higher rate corresponds to contains the original uplink DCH rate, then the original uplink DCH rate is not changed, so the uplink access control discrimination is not performed; otherwise, the new uplink DCH rate takes a value within the value domain and closest to the original uplink DCH rate and performs the uplink access control discrimination. If the minimum of the uplink DCH rate which the newly-allocated downlink DCH with a higher rate corresponds to still undergoes a failed uplink access control, the downlink DCH rate is marked and the occupying user is placed at the end of the queue thereof to wait for re-allocation, and during the re-allocation, the rate of the downlink DCH should be not greater than the marked rate during the previous failure. FIG. 9(d) shows an uplink DCH rate allocation process of an occupying user.

As for an occupied user, if an uplink DCH rate value domain which the newly-allocated downlink DCH rate corresponds to contains the original uplink DCH rate, then the original uplink DCH rate is not changed. If the maximum of the uplink DCH rate value domain which the newly-allocated downlink DCH rate corresponds to is smaller than the original uplink DCH rate, a further analysis should be performed on the traffic, flow or channel utilization ratio or other wireless measurement values of the original uplink DCH. If the measurement value is lower than a threshold $M_0^{UL}$, then the new uplink DCH rate takes the maximum of a value domain of the uplink DCH rate which the newly-allocated downlink DCH rate corresponds to; if the measurement value is lower than the threshold $M_0^{UL}$, the downlink DCH resources of the occupied user are not allowed to be occupied. When the occupying user intends to occupy the downlink DCH of the occupied user, the downlink DCH resources of the occupying user are not successfully allocated, and the occupying user is placed at the end of the queue thereof to wait for re-allocation; when a handover newly-added user resulting from a soft handover or a softer handover intends to occupy the downlink DCH of the occupied user, the downlink DCH in an available state of the occupied user should be re-allocated to the handover newly-added user.

(f) Adaptive Modulation of $T_{k,min}^{DL}$ and $T_{k,max}^{DL}$ $T_{k,min}^{DL}$ and $T_{k,max}^{DL}$ of downlink DCHs with different rates are allowed to have different values, and their typical values can be determined through computer simulation or practical experience. According to the present invention, $T_{k,min}^{DL}$ and $T_{k,max}^{DL}$ can be dynamically modulated using an adaptive method: when the length of the downlink DCH resource allocation queue exceeds a certain threshold, adaptively increasing $T_{k,min}^{DL}$ of a low-rate channel and/or decreasing $T_{k,max}^{DL}$ of a high-rate channel, so that the length of the downlink DCH resource allocation queue is kept within a reasonable range.

3. Bandwidth Allocation and Rate Control of Uplink DCHs for Non-Realtime services Different from a downlink, an uplink does not have a channel code resource limitation problem, and the DCH rate is only limited by an uplink interference load. Thus, the allocation of uplink DCH rate can be separately performed on each UE. Since the uplink and downlink DCH rates occur in pair and the downlink DCH rate is a decisive factor, the allocation of the uplink DCH rate will be limited by a current downlink DCH rate, that is, the allocation of the uplink DCH rate cannot change the current downlink DCH rate. The occupying and occupied users, common newly-added and handover newly-added users are non-static users, while the macro-diversity user does not perform an uplink and downlink DCH rate control, so the uplink DCH rate control is only performed on the maintenance user.

The downlink DCH of the maintenance user is in a blocked state, and the downlink DCH rate thereof is kept unchanged, but the uplink DCH rate thereof can individually perform bandwidth allocation and rate control, and the re-allocated uplink DCH rate thereof should be within a value domain range of the uplink DCH rate which the current downlink DCH rate of the user corresponds to. For example, according to the DCH rate configuration shown in FIG. 4, as for a user whose current downlink DCH rate is 384 kbps, its uplink DCH rate can only be selected from among 64 kbps, 128 kbps and 384 kbps.

When the downlink DCH of a user is in a blocked state, an uplink DCH occupancy timer is immediately started after the uplink DCH rate of the user is changed. If a value indicated by the timer is smaller than $T_{k,min}^{DL}$ the uplink DCH will not perform a rate re-allocation, no matter how the traffic, flow or channel utilization ratio or other wireless measurements of the uplink DCH is changed; if an uplink DCH is occupied for a time exceeding $T_{k,min}^{DT}$, and the traffic, flow or channel utilization ratio or other wireless measurements of the uplink DCH is lower than the upper limit $M_{low}^{UL}$ or exceeds the upper limit $M_{high}^{UL}$, then the uplink DCH rate will be decreased or increased, respectively. When it is necessary to increase the uplink DCH rate, the uplink access control discrimination should be performed, and if all the uplink DCHs with a rate higher than a current rate are not allowed to get access, then the uplink DCH occupancy timer will be reset, that is, the acquisition of a re-allocation opportunity can only be allowed again after $T_{k,min}^{DL}$ time.

The method for resource allocation and rate control of radio channels in a WCDMA communication system of the present invention is above-described in detail with reference to the accompanying drawings. Those skilled in the art know, according to the principles of the present invention, it is possible to make various modifications and improvements on the present invention, without departing from the scope of the enclosed claims of the present invention.

What is claimed is:

1. A method of performing resource allocation and rate control of Dedicated Channels DCHs for non-realtime data services in a code division multiple access communication system, wherein said DCHs comprise uplink DCHs and downlink DCHs, and the resource and rate allocation of the uplink DCH is performed on the basis of that of the downlink DCH, the method comprising:
   a) determining channel states of the downlink DCHs for non-realtime data services, wherein said DCH channel states include: a blocked state, a macro-diversity state, an available state, an idle state and a frozen state;
   b) determining states of users using said downlink DCHs, wherein said user states include: an occupying user, a common newly-added user, a handover newly-added user, an occupied user, a maintenance user or a macro-diversity user;
   c) correlating the channel states determined in step a) with the user states determined in step b), and dynamically allocating DCHs with certain rates to the users in the different user states according to a wireless measurement result measured by a current transmission channel, based on the priority and fairness requirements;
   d) starting a timer for timing downlink DCH occupancy after a DCH is allocated, and
   e) determining a state of said DCH by comparing said timer with the predetermined downlink DCH maximum occupancy time $T_{k,max}^{DL}$ and minimum occupancy time $T_{k,min}^{DL}$, in combination with the comparison between wireless measurements of said DCH and the lower limit $M_{low}^{UL}$ of the wireless measurements.

2. The method according to claim 1, wherein the respective DCH channel states in said step a) are determined as follows:
   Blocked state: the downlink DCH occupancy timer is started immediately after the DCH is allocated, and when the timer indicates a time less than $T_{k,min}^{DL}$, no matter how traffic, flow or channel utilization ratio and other wireless measurements of the DCH changes, channel resources of the DCH are always blocked and cannot be occupied by other users; if a DCH is occupied for a time exceeding $T_{k,min}^{DL}$ but within the maximum occupancy time $T_{k,max}^{DL}$, the traffic, or flow or channel utilization ratio and other wireless measurements of the DCH is higher than a lower limit $M_{low}^{DL}$, the channel resources will also be blocked; wherein $T_{k,min}^{DL}$ is the minimum occupancy time of the k-th downlink DCH and $T_{k,max}^{DL}$ is the maximum occupancy time of the k-th downlink DCH, where $T_{k,max}^{DL} > T_{k,min}^{DL}$; and k differentiates DCHs with different rates in an order from high to low;
   Macro-diversity State: when a user of a DCH in the present cell enters a macro-diversity state of a soft handover or a softer handover, the DCH enters the macro-diversity state, and an occupancy timer of a downlink DCH of the DCH is reset and pauses counting, and the DCH in this state does not perform a rate control;
   Available State: when a DCH is occupied for a time exceeding the maximum occupancy time $T_{k,max}^{DL}$, no matter how the traffic, flow or channel utilization ratio or other wireless measurements of the DCH varies, the DCH is always in an available state, that is, it can be occupied by other users; in addition, if a DCH is occupied for a time exceeding $T_{k,min}^{DL}$ but within the maximum occupancy time $T_{k,max}^{DL}$, and the traffic, flow, or channel utilization ratio or other wireless measurements of the DCH is lower than the lower limit $M_{low}^{DL}$, the resources of this channel will also be in an available state;
   Idle State: a DCH in an idle state is a DCH that is not used by any user in a current DCH channel set for non-realtime services, which is generated for the following reasons: a DCH is newly added for the adjustment of the DCH channel set for non-realtime services; a non-realtime service user ends a conversation and releases a DCH occupied thereby; a non-realtime service user performs a handover to other channels and releases a DCH occupied thereby; or a non-realtime service user performs a handover to other cells and releases a DCH occupied thereby;
   Frozen State: after receiving a downlink DCH resource re-allocation request, all the channels in a current downlink DCH resource pool are set in a frozen state; as for a DCH originally in a blocked state, its downlink DCH occupancy timer is paused, and all the operations of the DCH bandwidth allocation and rate control are also stopped, but the traffic, flow, or channel utilization ratio or other wireless measurements of the DCH are still performed; after the downlink DCH resource re-allocation is completed, the unchanged channels before and after the re-allocation are immediately restored into a state prior to the frozen state, and as for the changed DCHs, if a newly-assigned downlink DCH has a different rate from that of the original downlink DCH, a downlink DCH occupancy timer of the DCH is reset and the DCH enters a blocked state; otherwise, it enters the state prior to the frozen state, and the counting of the downlink DCH occupancy timer is resumed immediately after the DCH leaves the frozen state.

3. The method according to claim 1 further comprising stipulating state transfer among the respective channel states, comprising:
   the DCH newly-added for the re-allocation of the downlink DCH channel set for non-realtime services entering an idle state, a DCH in a blocked state entering an idle state since a user thereof ends a conversation and releases the channel, a DCH in an available state entering an idle state since a user thereof ends a conversation or performs a handover to other channels and releases the occupied channel, and a DCH in a macro-diversity state entering an idle state since a user thereof performs a handover to other cells and releases the occupied channel;

DCHs in idle and available states entering a blocked state for being allocated to an occupying or newly-added user, and a DCH in a macro-diversity state entering a blocked state since its user quits the macro-diversity but still stays in the present cell;

a DCH in a blocked state entering an available state when the channel occupancy time exceeding $T_{k,min}^{DL}$, and the traffic, flow or channel utilization ratio or other wireless measurements of the DCH is lower than the lower limit $M_{low}^{DL}$, or the channel occupancy time overruns, i.e., is greater than $T_{k,max}^{DL}$;

DCHs in idle, available and blocked states may enter macro-diversity state due to the soft handover or softer handover; and DCHs in idle, blocked, available and macro-diversity states entering and quitting a frozen state for the re-allocation of the downlink DCH channel resources for non-realtime services.

4. The method according to claim 1, wherein the respective user states in said step b) are determined as follows:

Occupying User: if a downlink DCH is occupied for a time exceeding $T_{k,min}^{DL}$, while the traffic, flow or channel utilization ratio or other wireless measurements of the downlink DCH exceeds the upper limit $M_{high}^{DL}$, a user of the downlink DCH is called an occupying user;

Common Newly-added User: a common newly-added user is a newly-added user since a non-realtime service user gets an initial access to a system or performs a handover from other channels to a DCH, the common newly-added user itself originally having no downlink DCH resources, and only a downlink DCH in an idle state being allowed to be allocated to a common newly-added user; and the original uplink and downlink DCH rates of the common newly-added user being marked as zero;

Handover Newly-added User: a handover newly-added user is a newly-added user due to a hard handover, a soft handover or a softer handover from other cells to the present cell, the handover newly-added user itself having no downlink DCH resources, downlink DCHs in idle and available states being allowed to be allocated to a handover newly-added user;

Occupied User: a user whose downlink DCH is in an available state is called an occupied user, wherein when the downlink DCH of the occupied user is occupied by an occupying user, the occupied user immediately occupies the original downlink DCH of the occupying user, that is, the occupying user and the occupied user adopt a channel permutation mode for a direct rate switching therebetween;

Maintenance User: a maintenance user is a user whose downlink DCH is in a blocked state, wherein the maintenance user does not occupy downlink DCH channel resources of other users, and meanwhile, the downlink DCH channel resources of the maintenance user cannot be occupied by other users either;

Macro-diversity User: a macro-diversity user is a user whose downlink DCH is in a macro-diversity state, wherein the macro-diversity user does not occupy downlink DCH resources of other users, and meanwhile, the downlink DCH resources of the macro-diversity user cannot be occupied by other users either.

5. The method according to claim 1, further comprising: determining a current downlink DCH available channel set for non-realtime data services on the basis of i) realtime and non-realtime service active users of DCHs in a current cell and downlink load change information, ii) allocation of power and orthogonal variable spreading factor channel codes, or iii) information relating to a handover between a common channel and a dedicated channel, user's initial access and release, and handover user's access and release, wherein the number of DCHs in said DCH available channel set is greater than or equal to the current number of active users for the non-realtime services.

6. The method according to claim 5, wherein the step of determining the current downlink DCH available channel set for non-realtime data services further comprises:
  i) setting in a frozen state the DCHs in said downlink DCH available channel set for non-realtime data services, based on downlink DCH channel resource re-allocation request message;
  ii) re-allocating a downlink DCH channel set for non-realtime data services based on a response to said request message, wherein the re-allocation can change the rates of DCHs in idle, available and blocked states, and a DCH in a macro-diversity state allows the re-allocation but its rate cannot be changed; in addition, if the re-allocation changes the DCHs originally in the available, blocked and macro-diversity states, users of these channels will be re-allocated a downlink DCH; and
  iii) updating the downlink DCH available channel set and assigning a new downlink DCH to said uses in step ii), wherein if the newly-assigned downlink DCH has a rate different from that of the original downlink DCH, the downlink DCH occupancy timer of the DCH is reset and the DCH enters a blocked state, and otherwise, it returns to a state prior to a frozen state.

7. The method according to claim 5, wherein the step of determining the current downlink DCH available channel set for non-realtime data services further comprises:
  when a new non-realtime service user gets an initial access to a system or performs a handover from other cells to the present cell, or performs a handover from other channels to said downlink DCH, the step of allocating a DCH to the newly-added user in said downlink DCH based on the type and rate requirement information of the newly-added user; and
  the step of releasing the DCH occupied by a non-realtime service user when said user ends a conversation, performs a handover out of the present cell or from the DCH to other channels.

8. The method according to claim 1, wherein said step c) further comprises: based on downlink loss levels, allocating DCH channel resource allocation queues with different priority levels to users of the different downlink loss levels.

9. The method according to claim 8, further comprising:
  allocating to a handover user a downlink DCH channel resource allocation queue with a first priority, said allocation queue with the first priority being formed of a single queue;
  allocating to a common newly-added user and an occupying user downlink DCH channel resource allocation queues with a second priority, said allocation queue with the second priority being formed of a plurality of queues with different priorities; and wherein, said allocation queue with the first priority has a higher priority than said allocation queue with the second priority and is allocated in preference a high-rate DCH.

10. The method according to claim 9, wherein said DCH resource allocation queue with the second priority adopts a weighed Round-Robin allocation scheme for allocation.

11. The method according to claim 8, further comprising classifying downlink losses in a cell into different levels in accordance with cell coverage and other configuration parameters determined in the cell wireless planning, and in that if the downlink loss which the downlink loss level of a user corresponds to is smaller, the user enters a downlink DCH resource allocation queue with a high priority when requiring the allocation of a DCH.

12. The method according to claim 11, further comprising obtaining the downlink loss through one of the following methods: i) a user equipment directly providing a measurement value of the downlink loss; or ii) obtaining the downlink loss by calculating a difference between a known transmitting power of a common pilot channel and a receiving signal channel power of said common pilot channel provided by the user equipment.

13. The method according to claim 1, wherein said step c) further comprises dynamically allocating a DCH with a certain rate to a soft-handover newly-added user through the following sub-steps, said sub-steps comprising:
   i) arranging said soft-handover newly-added user in the downlink DCH resource allocation queue with the first priority;
   ii) setting an initial downlink DCH rate of said soft-handover newly-added user to be the same as downlink DCH rates of other wireless links in an active set of said user, and carrying out an uplink and downlink access control discrimination;
   iii) searching for a downlink DCH for said downlink rate from downlink DCHs in an idle state, and allocating the downlink DCH in the idle state to said soft-handover newly-added user;
   iv) searching for a downlink DCH for said downlink rate from downlink DCHs in an available state, and allocating the downlink DCH in the available state to said soft-handover newly-added user;
   v) based on the downlink DCH allocated to said soft-handover newly-added user, allocating an uplink DCH with a corresponding rate to said user; and
   vi) canceling said soft-handover newly-added user from the allocation queue with the first priority.

14. The method according to claim 13, wherein,
if the access discrimination in step ii) fails, a response message is sent to indicate that the reason for the failure lies in an uplink and/or downlink access control failure, and meanwhile, the allocation is ended and said soft-handover newly-added user is canceled from the allocation queue with the first priority.

15. The method according to claim 13, wherein,
if the downlink DCH for said downlink rate fails to be found from the downlink DCHs in the available state in step iv), a response message is returned to indicate that there is no downlink DCH with a match rate, and meanwhile, the allocation is ended and said soft-handover newly-added user is canceled from the allocation queue with the first priority.

16. The method according to claim 13, wherein,
if the downlink DCH for said downlink rate is found from the downlink DCHs in the available state in step iv), a further determination is performed to determine whether a downlink DCH of an occupied user is allowed to be occupied;
if allowed to be occupied, the downlink DCH in the available state is allocated to said soft-handover newly-added user, and hence, the occupied user is re-allocated a downlink DCH with a rate closest to and smaller than its original downlink rate from downlink DCH resources in an idle state; otherwise, return to step iv), and search for a downlink DCH for said downlink rate from downlink DCHs in an available state for said soft-handover newly-added user.

17. The method according to claim 1, wherein said step c) further comprises dynamically allocating a DCH with a certain rate to a hard-handover newly-added user through the following sub-steps, said sub-steps comprising:
   i) arranging said hard-handover newly-added user in the downlink DCH resource allocation queue with the first priority;
   ii) setting a downlink DCH rate of said hard-handover newly-added user to be the same as its original downlink DCH rate, and carrying out a downlink access control discrimination;
   iii) determining whether a value allowed by the uplink access control and being equal to or smaller than an original uplink DCH rate of the hard-handover newly-added user can be found in an uplink DCH rate value domain corresponding to a downlink DCH with the downlink DCH rate;
   iv) searching for a downlink DCH for said downlink rate from downlink DCHs in an idle state, and allocating the downlink DCH in the idle state to said hard-handover newly-added user;
   v) searching for a downlink DCH for said downlink rate from downlink DCHs in an available state, and allocating the downlink DCH in the available state to said hard-handover newly-added user;
   vi) based on the downlink DCH allocated to said soft-handover newly-added user, allocating an uplink DCH with a corresponding rate to said user; and
   vii) canceling said hard-handover newly-added user from the allocation queue with the first priority.

18. The method according to claim 17, wherein:
if the access discrimination fails in step ii), taking a next smaller downlink DCH rate to undergo a downlink access control discrimination again; and
if there is no smaller rate for the access control discrimination, sending a response message to indicate the reason for the failure lies in an unlink and/or downlink access control failure, and at the same time, ending the allocation and canceling said hard-handover newly-added user from the allocation queue with the first priority.

19. The method according to claim 17, wherein:
if the value allowed by the uplink access control and being equal to or smaller than the original uplink DCH rate of the hard-handover newly-added user fails to be found in the uplink DCH rate value domain corresponding to a downlink DCH with the downlink DCH rate in step iii), taking a next smaller downlink DCH rate to repeat the determination in step iii); and
if there is no smaller rate for the determination in step iii), sending a response message to indicate the reason for the failure lies in an unlink and/or downlink access control failure, and meanwhile, ending the allocation and canceling said hard-handover newly-added user from the allocation queue with the first priority.

20. The method according to claim 17, wherein:
if the downlink DCH for said downlink rate fails to be found from the downlink DCHs in the available state in step v), taking a smaller downlink DCH rate, returning step iv) and searching again a downlink DCH for the smaller downlink rate from downlink DCHs in an idle state.

21. The method according to claim 17, wherein,
if the downlink DCH for said downlink rate is found in the downlink DCHs in an available state in step iv), a further determination is performed to determine whether a downlink DCH of an occupied user allows to be occupied;
if allows to be occupied, the downlink DCH in the available state is allocated to said hard-handover newly-added user, and hence the occupied user is re-allocated a downlink DCH with a rate closest to and smaller than its original downlink rate from the downlink DCH channel resources in the idle state;
otherwise, a downlink DCH for said downlink rate is re-searched for from the downlink DCHs in the available state for said hard-handover newly-added user.

22. The method according to claim 1, wherein said step c) further comprises dynamically allocating a DCH with a certain rate to a common newly-added user through the following sub-steps, said sub-steps comprising:
i) arranging said common newly-added user in the downlink DCH resource allocation queue with a second priority;
ii) determining whether there exists a downlink DCH in an idle state and allowed by the access control, and allocating the downlink DCH to said common newly-added user;
iii) determining whether there is an uplink rate allowed by the uplink access control within a value domain range of an uplink DCH rate corresponding to said downlink DCH rate, and allocating the maximum of the uplink DCH rate allowed by the uplink access control to said common newly-added user; and
iv) canceling said common newly-added user from the allocation queue with the second priority.

23. The method according to claim 22, wherein
if the downlink DCH allowed to be accessed fails to be found in the channels in an idle state in step ii), placing said common newly-added user at the end of a queue thereof to wait for re-allocation.

24. The method according to claim 22, wherein said DCH resource allocation queue with the second priority adopts a weighed Round-Robin allocation scheme for allocation.

25. The method according to claim 1, wherein said step c) further comprises dynamically allocating a DCH with a certain rate to an occupying user through the following sub-steps, said sub-steps comprising:
i) arranging said occupying user in the downlink DCH resource allocation queue with the second priority;
ii) determining whether there exists a downlink DCH in an idle state allowed by the downlink access control and having a rate higher than an original downlink rate of said occupying user, and allocating the high-rate downlink DCH to said occupying user;
iii) determining whether there exists a downlink DCH in an available state allowed by the downlink access control and having a rate higher than the original downlink rate of said occupying user, and allocating the high-rate downlink DCH to said occupying user;
iv) determining whether the value domain range of the uplink DCH rate corresponding to a rate of the high-rate downlink DCH contains an original uplink DCH rate of said occupying user, and setting the uplink DCH rate of said occupying user as its uplink rate; and
v) canceling said occupying user from the allocation queue with the second priority.

26. The method according to claim 22, wherein
if an uplink rate allowed by the uplink access control fails to be found within the value domain range of the uplink DCH rate corresponding to said downlink DCH rate in step iii), marking the downlink DCH rate, and placing said common newly-added user at the end of the queue thereof to wait for re-allocation.

27. The method according to claim 25, wherein said DCH resource allocation queue with the second priority adopts a weighed Round-Robin allocation scheme for allocation.

28. The method according to claim 25, wherein
if a downlink DCH in an available state allowed to be accessed by the uplink access control and having a rate higher than the original downlink rate of said occupying user does not exist in step iii), placing said occupying user at the end of the queue thereof to wait for re-allocation.

29. The method according to claim 25, wherein
if it is determined that there exists the downlink DCH in an available state allowed by the downlink access control and having a rate higher than the original downlink rate of said occupying user in step iii), a further determination is performed to determine whether a downlink DCH of an occupied user allows to be occupied;
if allows to be occupied, performing the determination in step iv);
otherwise, placing said occupying user at the end of the queue thereof to wait for re-allocation.

30. The method according to claim 25, wherein
if it is determined that the value domain range of the uplink DCH rate corresponding to the rate of the high-rate downlink DCH does not contain the original uplink DCH rate of said occupying user, a further determination is performed to determine whether there is a rate allowed by the uplink access control within said value domain range of the uplink DCH rate; and
if there is, the uplink rate allowed by the uplink access control within said value domain range of the uplink DCH rate and being closest to the original uplink DCH rate of the occupying user is allocated to said occupying user;
otherwise, the current downlink DCH rate is marked and said occupying user is placed at the end of the queue thereof to wait for re-allocation.

31. The method according to claim 25, wherein
when the occupying user employs a DCH in an idle state, its original downlink DCH is released as an idle channel; and
when the occupying user employs a DCH in an available state, its original downlink DCH is allocated to the occupied user.

32. The method according to claim 1, wherein adaptively increasing $T_{k,min}^{DL}$ of a low-rate channel and/or decreasing $T_{k,max}^{DL}$ of a high-rate channel, when the length of a downlink DCH resource allocation queue exceeds a predetermined threshold.

33. The method according to claim 1, wherein a result of said wireless measurements comprises a traffic measurement result, a flow measurement result of a transmission channel or a channel utilization ratio measurement result.

34. The method according to claim 1, wherein said code division multiple access communication system is a wide code division multiple access communication system.

* * * * *